March 20, 1956  C. A. KIEFFABER  2,738,912
LID REMOVING DEVICE FOR PANS
Filed Nov. 12, 1953  2 Sheets-Sheet 1
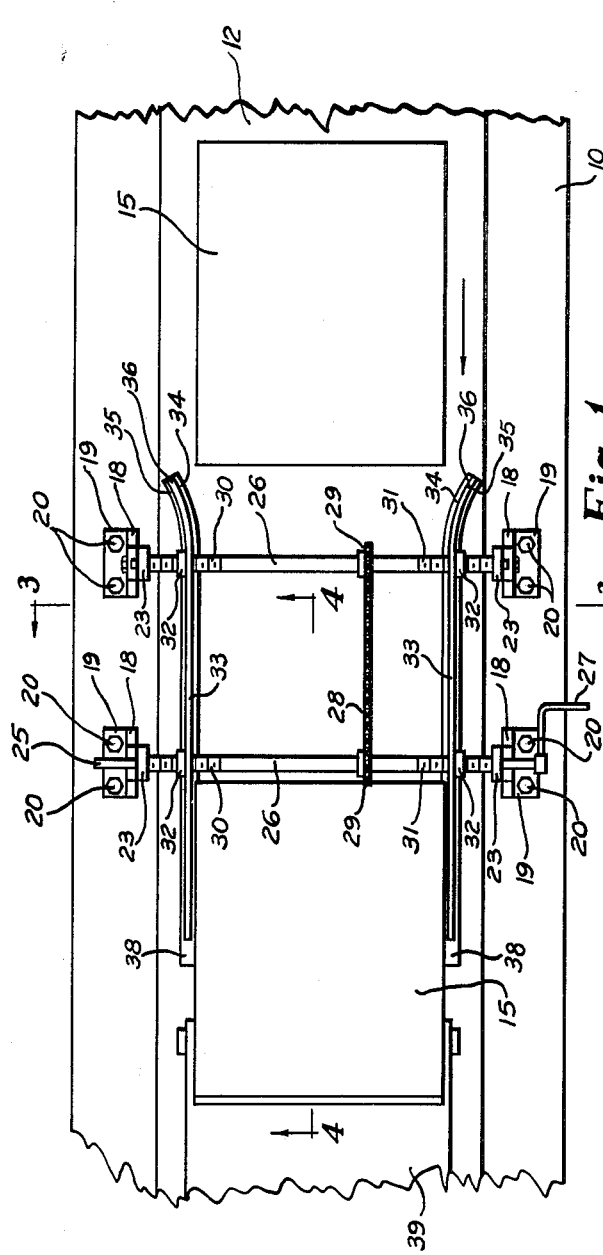
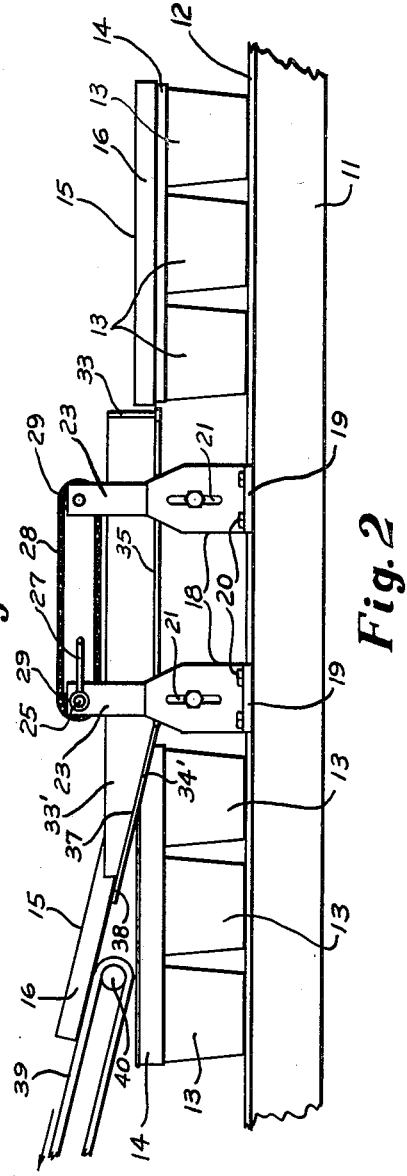
INVENTOR.
CLARENCE A. KIEFFABER
BY
Alfred R. Fuchs
ATTORNEY March 20, 1956 C. A. KIEFFABER 2,738,912
LID REMOVING DEVICE FOR PANS
Filed Nov. 12, 1953 2 Sheets-Sheet 2

INVENTOR.
CLARENCE A. KIEFFABER
BY
Alfred R. Fuchs
ATTORNEY

United States Patent Office 2,738,912
Patented Mar. 20, 1956

2,738,912

LID REMOVING DEVICE FOR PANS

Clarence A. Kieffaber, Overland Park, Kans., assignor to Stickelber & Sons, Inc., a corporation of Missouri Application November 12, 1953, Serial No. 391,477

14 Claims. (Cl. 226—129)

My invention relates to lid removing apparatus, and more particularly to a lid removing device for bread pans.

In the baking of certain varieties of bread, such as sandwich bread, the bread pans are covered with lids after the molded loaf of bread has been placed therein and the bread is baked with these lids in position to provide a substantially rectangular cross section to the loaf. In order to remove the bread from the pans and refill the same it is necessary to remove the lids, and my apparatus is particularly adapted for this purpose.

It is a purpose of my invention to provide a lid removing device for pans of the above mentioned character, which is simple in construction and embodies a small number of parts, all of the parts of the removing means being stationary except the conveying means that carries the pans to the removing apparatus and serves as means for engaging the lids with the removing means and to carry the pans away along a different path than that taken by the lids.

More specifically my invention comprises lid removing means of the above mentioned character comprising conveying means and transversely spaced stationary guide members that serve to separate the lids from the pans as said pans with the lids in position thereon are moved into engagement with said guide members and lengthwise of the same, said guide members comprising lid supporting means that are engaged by the lids on the pans as said pans are moved along by the conveying means so constructed and arranged that said supporting means and said conveying means are uniformly spaced from each other through a portion of the length of said supporting means and are relatively divergent through the remainder of the length of said supporting means to thus separate the lids and the pans.

My lid removing means particularly comprises guide members that have vertically extending walls and laterally extending flanges that extend toward each other that act as a supporting means for the lids, said vertically extending walls serving to guide said lids in a desired path during and after removal from the pans. Said vertically extending walls of said guide members have outwardly diverging curved entrance ends but are otherwise parallel to each other throughout the length thereof.

It is a further purpose of my invention to provide lid removing means of the above mentioned character that are adapted for use in removing lids from pans of various sizes, the elevation of the supporting means for the lids relative to the conveying means being adjustable for this purpose, and the pair of guide members that comprise the lid supporting means being mounted for movement toward and away from each other for accommodating pans of various lengths.

Other objects and advantages of my information will appear as the description of the drawings proceeds. I desire to have it understood, however, that I do not intend to limit myself to the particular details shown or described, except as defined by the claims.

In the drawings:

Fig. 1 is a plan view of my improved lid removing means, the conveying means and table over which the same passes being broken away.

Fig. 2 is a side elevational view of the lid removing means, and the conveying means and table are similarly broken away therein.

Figure 3:
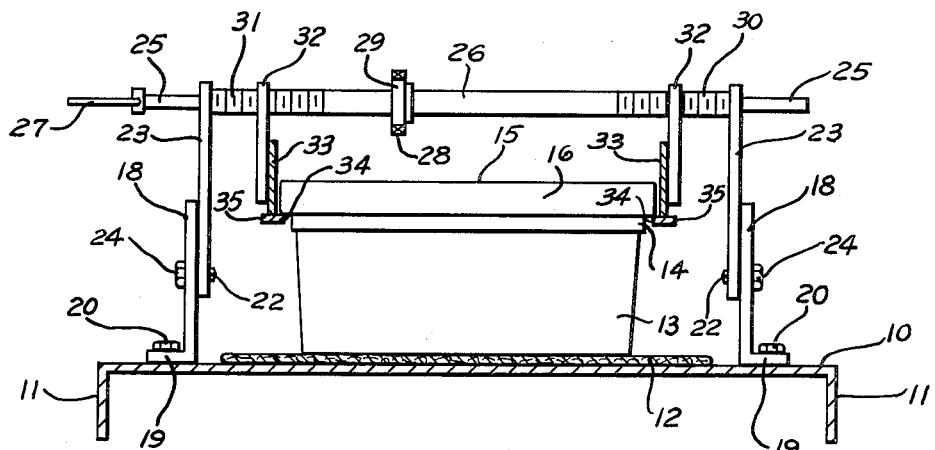
Fig. 3 is a section taken on the line 3—3 of Fig. 1 on an enlarged scale.

Referring in detail to the drawings, my improved lid removing device is shown as being mounted on a support that is in the form of a table 10 having depending flanges 11 thereon, a conveyor belt 12 being shown as extending across the top of the table 10 in engagement therewith, said conveyor being driven in any suitable manner and moving in the direction of the arrow shown thereon in Fig. 1. Said conveyor serves as a pan conveyor to carry the pans 13 from right to left as viewed in the drawings, said pans being secured together in groups in the usual manner by means of straps 14 extending around the upper portions thereof in a well known manner. While three pans are shown as being in the group that is secured together by the strap 14, this number may vary in accordance with the desires and customs of the particular baker using the same.

Mounted on the pans are lids 15 which have depending flanges 16 that extend down over the sides and ends of the pans and are shorter than the width of the straps 14, as shown in the drawings, although this is not absolutely necessary. The lower end edges of the flanges 16 are turned back on themselves as shown at 17 to stiffen the same, thus providing a somewhat rounding edge on the lower margin of each of the flanges 16.

Mounted on the table 10 or other suitable support adjacent the conveyor belt 12 are upstanding bracket members 18, which are shown as having base flanges 19 that are secured to the support, such as the table 10, by suitable fastening elements 20. Said brackets have vertically extending slots 21 therein, which have the shank portions of screw-threaded headed fastening elements 22 extending therethrough, said screw-threaded headed fastening elements screw-threadedly engaging in openings in the upper bracket portions 23, the heads 24 of said fastening elements bearing against the upstanding bracket members 18 and serving to clamp the upper bracket members 23 in adjusted position relative to the bracket members 18. Standards are thus provided extending upwardly from the supporting means, such as the table 10, that are adjustable in height. The upper ends of the bracket portions 23 are reduced somewhat in size and have bearing openings therein for the reduced end portions 25 of the shafts 26.

Said shafts have shoulders between the main body portions thereof, which are of larger diameter, and the reduced end portions 25 that fit against the inner faces of the bracket portions 23, thus holding said shafts against any endwise movement. One of said reduced end portions 25 is provided with a crank 27 for rotating said shaft, the other shaft 26 being rotated in unison with the crank 27 due to the provision of the sprocket chain 28 extending over the sprocket wheels 29 provided on said shafts and fixed thereon to rotate therewith. Said shafts are provided with threaded portions 30 and 31 of opposite pitch at the opposite ends of the main body portions 26 thereof and depending brackets 32 have screw-threaded engagement with said threaded portions. It will be obvious that said brackets 32 will be moved in opposite directions by rotation of the shafts 26 to thus either move said brackets toward or away from each other, depending in which direction the crank 27 is operated.

Mounted in fixed position on the pair of brackets 32 that engage with the threaded portions 30 is a vertical wall 33 of a guide member that extends generally lengthwise of the conveyor 12, and a vertical wall 33 of a cooperating guide member is similarly mounted on the pair of depending brackets 32 having screw-threaded engagement with the screw-threaded portions 31 of the shafts 26. Said guide members are substantially inverted T-shape in cross section having lower transverse portions providing laterally extending inwardly directed flanges 34 and outwardly directed flanges 35.

The major portions of the vertical walls 33 of said guide members extend in parallelism to each other, but are provided with diverging entrance ends 36 that curve outwardly away from each other, as will be obvious from Fig. 1. Said outwardly curved ends 36 and the flanges 34 and 35 thereon similarly curved serve to guide the lids 15 into position between the parallel portions of said vertically extending walls 33 so that the convexly curved lower marginal portions of the longitudinally extending flanges 16 of the lids 15 will be in position above the flanges 34 so as to cooperate therewith in a manner to be described below. The flanges 34 at the entrance end and for a substantial distance from the entrance of said guide members toward the exit end thereof extend substantially parallel to the conveyor belt 12. Said guide members are, however, provided with tapering rear portions extending to the exit end of said guide members, the vertical walls 33 having rear end portions 33' that have an inclined bottom edge 37 and the flanges having upwardly inclined portions 34' extending along said inclined bottom edges 37 and projecting inwardly therefrom in the same manner as the flanges 34 on the main body portions of said guide members. It will be noted that the lower transverse portions of the guide members are made up of bars that are relatively narrow, as compared with the height of the vertical walls 33 and are mounted on the bottom edges of said walls 33 and fixed thereto, as by welding, and that said bars extend slightly beyond the ends of the tapering portions 33' of the vertical walls, as indicated at 38, thus forming inclined lips that extend rearwardly from the exit ends of the upstanding walls of the guide members.

Figure 4:
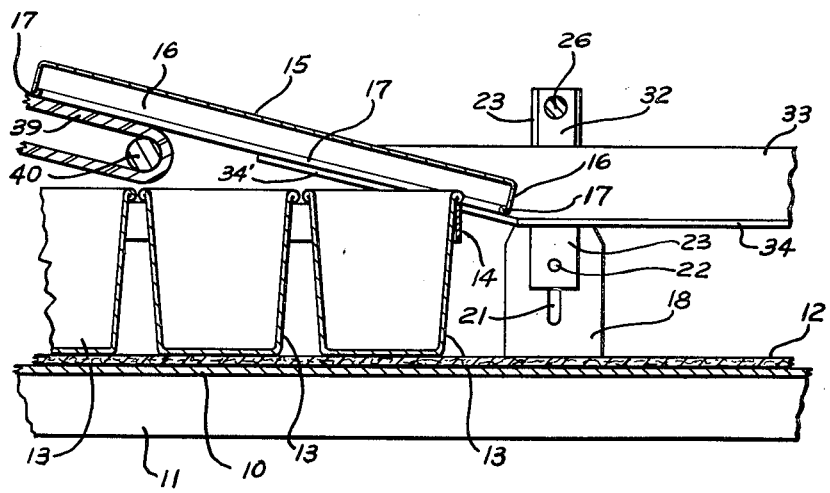
Fig. 4 is a fragmentary section on an enlarged scale taken on the line 4—4 of Fig. 1.

It will be obvious that as the group of pans 13 is moved from right to left in Figs. 1, 2 and 4 of the drawings, with the lid 15 thereon the depending flanges 16 on said lid at their bottom convex edge portions will first move along over the inwardly directed flanges 34 of the guide members 33 and will be carried upwardly on the upwardly inclined flange portions 34', which diverge from the conveyor belt 12 when the same reach said upwardly inclined portions, thus being gradually raised upwardly off the pans. Also it will be obvious that when a lid 15 reaches the position shown in Fig. 4, the next succeeding lid on the next group of pans will engage with the transverse flange 16 at the rear end of lid 15 and will move said lid upwardly along said inclined flanges 34', this continuing until the lid 15 reaches such a position that it will engage with a lid conveyor, such as the conveyor belt 39, operating over the roller 40 and driven in any suitable manner in the direction of the arrow in Fig. 2, whereupon said conveyor 39 will pull the lid off the inclined guide flanges 34' and carry said lid away to any suitable point of deposit thereof, the pans continuing on the conveyor belt 12 to their destination.

It will be noted that the only movable parts of the apparatus are the conveyors 12 and 39 and that the lid removing guide members have no parts thereof that move during the operation of the device in removing lids from pans, the only movement required of the parts being for adjustment for different length and height of pans that may be presented to the lid removing means by the conveyor belt 12.

What I claim is:

1. Lid removing apparatus comprising conveying means traveling in a predetermined direction, and spaced stationary lid guides mounted in an elevated position relative to said conveying means, said guides having lid supporting portions diverging in the direction of travel of said conveying means from said conveying means.

2. Lid removing apparatus comprising conveying means, and spaced lid guides mounted in an elevated position relative to said conveying means, said guides having straight portions vertically spaced from and extending substantially parallel to the path of said conveying means and lid supporting portions diverging from said conveying means.

3. Lid removing apparatus comprising conveying means, and spaced stationary lid guides mounted in an elevated position relative to said conveying means, means for adjusting the elevation of said guides, said guides having lid supporting portions diverging from said conveying means.

4. Lid removing apparatus comprising conveying means, and spaced stationary lid guides mounted in an elevated position relative to said conveying means, said guides having lid supporting means vertically spaced from said conveying means, said lid supporting means and said conveying means having relatively divergent portions.

5. Lid removing apparatus comprising conveying means, and spaced stationary lid guides mounted in an elevated position relative to said conveying means and extending lengthwise thereof, said guides having lateral flanges thereon, said flanges and said conveying means being parallel adjacent the entrance ends of said guides and relatively divergent adjacent the exit ends of said guides.

6. Lid removing apparatus comprising conveying means traveling in a predetermined direction, and spaced stationary lid guides mounted in an elevated position relative to said conveying means and extending lengthwise thereof, said guides and said conveying means being relatively divergent in the direction of travel of said conveying means adjacent the exit ends of said guides, said guides having portions extending parallel to said conveying means and diverging from each other at the entrance ends thereof.

7. Lid removing apparatus comprising conveying means traveling in a predetermined direction, and spaced lid guides mounted in an elevated position relative to said conveying means, said guides having upstanding walls and laterally projecting lid supporting flanges, said flanges and said conveying means having portions relatively divergent in the direction of travel of said conveying means.

8. Lid removing apparatus comprising conveying means traveling in a predetermined direction, and spaced lid guides mounted in an elevated position relative to said conveying means, said guides having upstanding parallel walls and laterally projecting lid supporting flanges extending toward each other, said flanges and said conveying means having portions relatively divergent in the direction of travel of said conveying means.

9. An apparatus for removing lids from pans, comprising a pan conveyor, and stationary lid supporting guides above said conveyor, said guides being transversely spaced relative to the path of said conveyor and extending lengthwise thereof, said guides having inwardly directed lid supporting portions thereon, said lid supporting portions and conveyor extending substantially parallel to each other for a predetermined distance from the entrance ends of said guides and being relatively divergent for the remainder of the distance to the exit ends of said guides.

10. Lid removing apparatus, comprising conveying means, and spaced stationary, rigid lid guides mounted in an elevated position relative to said conveying means, said guides having lid supporting portions diverging from said conveying means and a lid conveyor mounted in a position to receive said lids from said guides.

11. Lid removing apparatus, comprising conveying means, and spaced stationary lid guides mounted in an elevated position relative to said conveying means and extending lengthwise thereof, said guides having lid supporting portions theron, said lid supporting portions and said conveying means being relatively divergent adjacent the exit ends of said guides, and a lid conveyor mounted beyond the exit ends of said guides in a position to receive said lids from said guides at the exit ends thereof.

12. An apparatus for removing lids from pans, comprising a pan conveyor, and stationary lid supporting guides above said conveyor, said guides being transversely spaced relative to the path of said conveyor and extending lengthwise thereof, said guides having upstanding walls and laterally projecting lid supporting flanges, said flanges and conveyor extending substantially parallel to each other for a predetermined distance from the entrance ends of said guides and being relatively divergent for the remainder of the distance to the exit ends of said guides.

13. An apparatus for removing lids from pans, comprising a pan conveyor, and stationary lid supporting guides above said conveyor, said guides being transversely spaced relative to the path of said conveyor and extending lengthwise thereof, said guides having upstanding walls and laterally projecting lid supporting flanges, said flanges and conveyor extending substantially parallel to each other for a predetermined distance from the entrance ends of said guides and being relatively divergent for the remainder of the distance to the exit ends of said guides, said upstanding walls being substantially parallel through the major portion of their length.

14. An apparatus for removing lids from pans, comprising a pan conveyor, stationary lid supporting guides above said conveyor, said guides being transversely spaced relative to the path of said conveyor and extending lengthwise thereof, said guides having upstanding walls and laterally projecting lid supporting flanges, said flanges and conveyor extending substantially parallel to each other for a predetermined distance from the entrance ends of said guides and being relatively divergent for the remainder of the distance to the exit ends of said guides, said upstanding walls being substantially parallel through the major portion of their length, and a lid conveyor mounted in a position to receive lids from the exit ends of said guides.

References Cited in the file of this patent
UNITED STATES PATENTS

| | | |
|---|---|---|
| 1,870,999 | Kantor | Aug. 9, 1932 |
| 2,074,815 | Tevander | Mar. 23, 1937 |
| 2,650,748 | Bennett | Sept. 1, 1953 |
| 2,675,953 | Van Poolen | Apr. 20, 1954 |